United States Patent
Yamada et al.

(10) Patent No.: US 9,644,507 B2
(45) Date of Patent: May 9, 2017

(54) OIL PAN STRUCTURE (75) Inventors: Kenichi Yamada, Yaizu (JP); Hideo Kobayashi, Mishima (JP); Katuhiko Arisawa, Gotemba (JP); Toshihisa Sugiyama, Gotemba (JP); Kunihiko Hayashi, Odawara (JP); Ryo Michikawauchi, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 308 days.

(21) Appl. No.: 12/602,062

(22) PCT Filed: May 29, 2008

(86) PCT No.: PCT/JP2008/060322
§ 371 (c)(1),
(2), (4) Date: Nov. 25, 2009

(87) PCT Pub. No.: WO2008/149912
PCT Pub. Date: Dec. 11, 2008

(65) Prior Publication Data
US 2010/0199942 A1 Aug. 12, 2010

(30) Foreign Application Priority Data
May 31, 2007 (JP) ................................. 2007-144996

(51) Int. Cl.
*F01M 11/04* (2006.01)
*F01M 11/00* (2006.01)
(Continued)

(52) U.S. Cl.
CPC ....... *F01M 11/0004* (2013.01); *F16N 31/004* (2013.01); *F01M 2005/023* (2013.01);
(Continued)

(58) Field of Classification Search
CPC ... F01M 2011/0033; F01M 2011/0037; F01M 11/0004; F01M 2005/023; F16N 31/00; F16N 31/002; F16N 31/004; F16N 31/02
(Continued)

(56) References Cited

U.S. PATENT DOCUMENTS 1,926,077 A * 9/1933 Winslow ..................... 123/79 R
4,296,716 A * 10/1981 Hofbauer et al. ........ 123/195 C
(Continued)

FOREIGN PATENT DOCUMENTS

JP 05-010210 A 1/1993
JP 08-296500 A 11/1996
(Continued)

OTHER PUBLICATIONS

Communication dated Apr. 19, 2011 in corresponding European Patent Application No. 08765135.2.

Primary Examiner — Jacob Amick
(74) Attorney, Agent, or Firm — Sughrue Mion, PLLC (57) ABSTRACT An oil pan structure (1) includes a lower structure (2) fixed to a lower portion of an engine block, a main oil pan (3) provided under an engine block with the lower structure being between the main oil pan and the engine block, a sub oil pan (5) that is provided in the main oil pan (3) and forms a first chamber (6) and a second chamber (7) inside the main oil pan (3). The sub oil pan (5) is separated into an upper body (5*a*) and a lower body (5*b*). The upper body (5*a*) is formed together with the lower structure (2) by injection molding.

4 Claims, 6 Drawing Sheets (51) Int. Cl.
*F16N 31/00* (2006.01)
*F01M 5/02* (2006.01)

(52) U.S. Cl.
CPC .............. *F01M 2011/0037* (2013.01); *F01M 2011/0045* (2013.01); *F01M 2011/0087* (2013.01)

(58) Field of Classification Search
USPC ............ 123/195 A, 195 R, 41.81, 79 R, 275, 123/195 H, 196 R, 195 C, 198 E
See application file for complete search history.

(56) References Cited

U.S. PATENT DOCUMENTS

| | | | |
|---|---|---|---|
| 5,103,782 A * | 4/1992 | Matsui .................... | 123/195 C |
| 5,469,822 A * | 11/1995 | Mechsner ................ | 123/195 C |
| 5,601,060 A * | 2/1997 | Smietanski et al. ...... | 123/195 C |
| 5,960,763 A * | 10/1999 | Yamamura ............... | 123/195 C |
| 6,131,543 A * | 10/2000 | Achenbach et al. ...... | 123/195 C |
| 6,234,136 B1 * | 5/2001 | Choi et al. ............... | 123/195 C |
| 6,640,767 B2 * | 11/2003 | Kato et al. ............... | 123/195 C |
| 7,069,899 B1 * | 7/2006 | Okuda et al. ............. | 123/195 C |
| 7,171,937 B2 * | 2/2007 | Hada et al. ............... | 123/195 C |
| 7,654,241 B2 * | 2/2010 | Kobayashi et al. ...... | 123/195 C |
| 8,066,100 B2 * | 11/2011 | Mori et al. ................ | 184/106 |
| 8,302,577 B2 * | 11/2012 | Wunsch et al. .......... | 123/196 R |
| 2003/0029412 A1 * | 2/2003 | Kato et al. ............... | 123/195 C |
| 2004/0079318 A1 * | 4/2004 | Batzill et al. ............. | 123/195 C |
| 2005/0081814 A1 * | 4/2005 | Saito ........................ | 123/195 C |
| 2005/0279314 A1 * | 12/2005 | Hada et al. ............... | 123/192.1 |
| 2006/0207542 A1 * | 9/2006 | Takano .................... | F02B 75/06 123/192.2 |
| 2008/0083586 A1 * | 4/2008 | Kobayashi ............... | F01M 5/02 184/6.4 |
| 2010/0132655 A1 * | 6/2010 | Wunsch et al. .......... | 123/196 R |
| 2010/0147253 A1 * | 6/2010 | Burke et al. ............. | 123/195 C |

FOREIGN PATENT DOCUMENTS

| | | |
|---|---|---|
| JP | 2001-152825 A | 6/2001 |
| JP | 2003-222012 A | 8/2003 |
| WO | 2006/095880 A1 | 9/2006 |

* cited by examiner

OIL PAN STRUCTURE

TECHNICAL FIELD

This invention generally relates to an oil pan structure provided under an engine block and storing engine oil.

BACKGROUND ART

Conventionally, engine oil is being used for lubricating and cooling of an engine. The engine oil is stored in an oil pan provided under an engine. The engine oil circulates through each part of the engine by an oil pump. The engine oil circulating through each part of the engine falls to the oil pan. The engine oil falling into the oil pan circulates through each part of the engine again by the oil pump. During the process, the engine oil receives heat from each part of the engine and cools each part of the engine. The engine oil forms an oil film on each part of the engine, promotes lubrication between each of components, and restrains oxidation of the components.

Here, the condition of the engine oil is not adequate for the circulation through and lubrication of each part of the engine just after cold starting of the engine, because the engine oil stored in the oil pan has low temperature and high viscosity. It is therefore preferable that the temperature of the engine oil is raised as rapidly as possible and the viscosity of the engine oil is adequately adjusted, just after the cold starting. It is therefore already reviewed that: the oil pan is separated into sections; a condition where engine oil in one of the sections tends to be circulated just after a cold starting is made; and the engine oil in the section is promptly heated (with reference to Patent Document 1).

The prompt heating of the engine oil contributes to improvement of fuel efficiency caused by prompt reduction of friction. Recently, it is demanded that prompt heating of engine oil is further improved, because the improvement of fuel efficiency is strongly demanded. An oil pan structure of Patent Document 2 is suggested in view of this point. Patent Document 2 suggests a structure in which an oil pan includes an oil pan separator separating the oil pan into a main chamber having a suction port of the engine oil and a sub chamber not having the suction port, and a communication hole making a communication between the main chamber and the sub chamber is provided. The communication hole controls conduction of the engine oil between the main chamber and the sub chamber using viscosity changing of the engine oil. The main chamber may be called "a first chamber". The sub chamber may be called "a second chamber". The oil pan separator may be called "a sub oil pan". The oil pan may be called "a main oil pan".

Patent Document 1: Japanese Patent Application Publication No. 2001-152825
Patent Document 2: Japanese Patent Application Publication No. 2003-222012

DISCLOSURE OF THE INVENTION

Problems to be Solved by the Invention

However, the temperature of the engine oil may be increased excessively if the prompt heating of the engine oil is emphasized and a small amount of the engine oil is circulated continuously. In this case, a part of the oil may be degraded early. The viscosity of the engine oil is high and the engine oil circulating through each part of the engine returns to the oil pan again gradually, at extremely low temperature, for example, when the temperature of the engine oil is −10 degrees C. This may result in lack of circulation amount of the engine oil and the engine oil is not provided to each part of the engine sufficiently. In particular, the circulation amount of the engine oil runs short and air may be withdrawn in a worst case, if the circulation amount of the engine oil is small in order to increase the temperature of the engine oil promptly. That is, it is required that a small amount of the engine oil circulates and the prompt heating is achieved during the cold starting of the engine. However, on the other hand, there is a problem that the engine oil may be degraded because the circulation amount of the engine oil is small during the cold starting of the engine. And the circulation amount of the engine oil may run short.

The amount of the engine oil stored in the main chamber is adjusted in view of the prompt heating of the engine oil and the degradation of the engine oil. Here, a communication hole may be formed in a sidewall of a sub oil pan acting as a partition between the main chamber and the sub chamber. An upper edge of the sidewall of the sub oil pan forms a communication portion acting as a distribution path of the engine oil. It is demanded that dispersion between products is reduced as much as possible with respect to the communication hole and the communication portion determining flow of the engine oil between the main chamber and the sub chamber. And it is demanded that the communication hole and the communication portion are arranged accurately. This requires assembling accuracy of the oil pan structure.

The present invention has an object to provide an oil pan structure assembled accurately in which a sub oil pan is fixed accurately with respect to a predetermined oil level.

Means for Solving the Problems

In order to solve the problem, an oil pan structure of the present invention is characterized by including a main oil pan provided under an engine block and a sub oil pan that is provided inside of the main oil pan and forms a first chamber and a second chamber inside of the main oil pan, the sub oil pan being separated into an upper body formed integrally with a lower structure of the engine block and a lower body fixed to the upper body. The oil pan structure of the present invention has a double-bath oil pan structure in which a chamber storing engine oil is separated into the first chamber and the second chamber. The first chamber is formed inside of the second chamber. A stuck port of a strainer is arranged in the first chamber. An upper portion of the first chamber has an opening so that engine oil circulating through the engine block flows into the first chamber. The first chamber is mainly formed of the sub oil pan. The sub oil pan is separated into the upper body and the lower body. The lower body includes a bottom portion of the sub oil pan. On the other hand, the upper body includes a sidewall of the sub oil pan. The upper body has a communication portion for flowing of the engine oil between the first chamber and the second chamber. The positional accuracy of the communication portion is improved if the upper body having the communication portion is formed integrally with the lower structure of the engine block. That is, the sub oil pan having the communication portion is accurately fixed with respect to a predetermined oil level. Dispersion between products is reduced.

The lower structure of the engine block formed integrally with the upper body may act as a bottom portion of the engine block. The lower structure may be separated from the engine block and may be provided between the engine block and the main oil pan. In this case, the lower structure separated from the engine block may act as an oil pan if the main oil pan is fixed to the lower structure.

The upper body of the sub oil pan may include a first communication portion and a second communication portion making a communication between the first chamber and the second chamber, height of the first communication portion and the second communication portion being different from each other.

Effects of the Invention

In accordance with the present invention, a sub oil pan provided in a main oil pan and forming a first chamber and a second chamber in the main oil pan is separated into an upper body formed integrally with a lower structure of an engine block and a lower body fixed to the upper body. Therefore, the sub oil pan is accurately fixed with respect to a predetermined oil level in an oil pan.

BEST MODES FOR CARRYING OUT THE INVENTION

A description will be given of best modes for carrying out the present invention with reference to following drawings.
[Embodiment]

Figure 1:
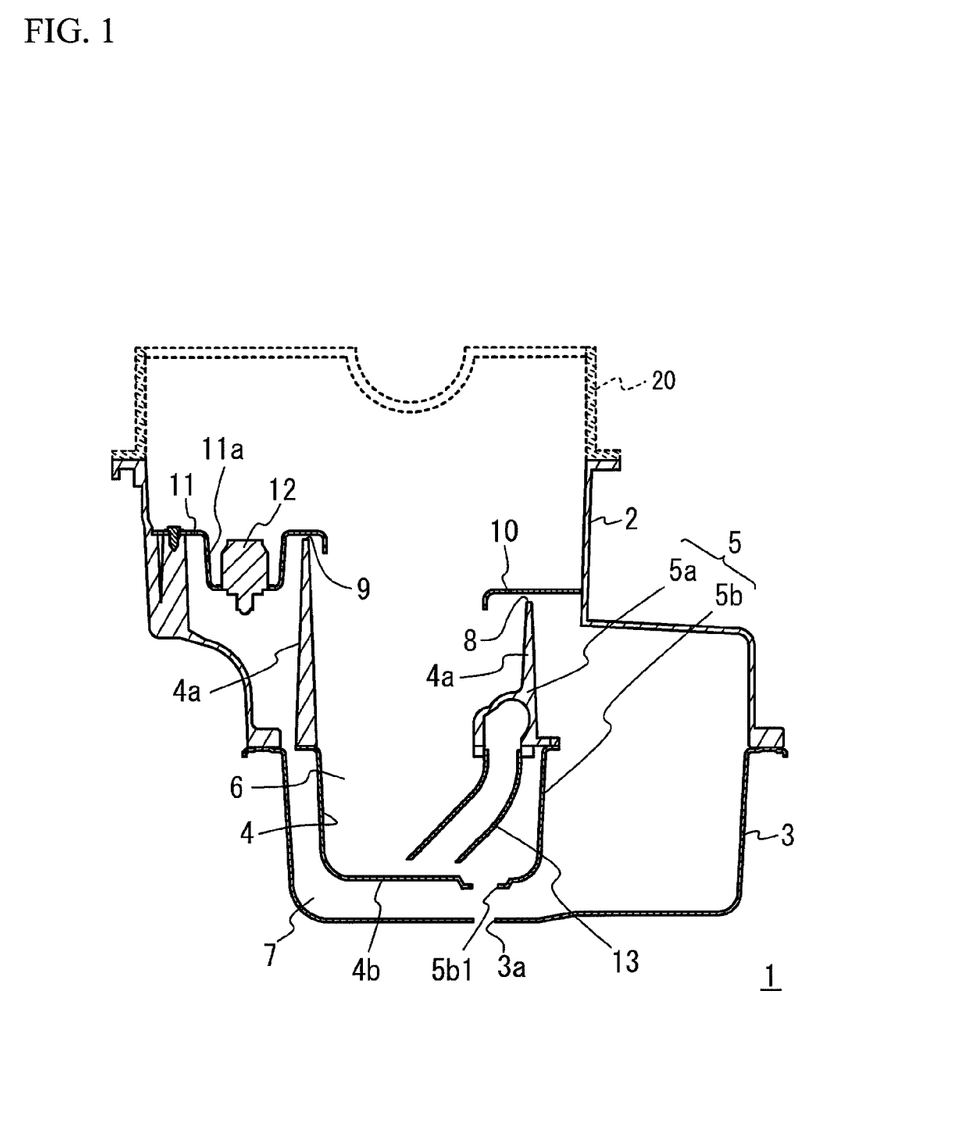
FIG. 1 illustrates an explanatory cross sectional view of an oil pan structure.
Figure 2:
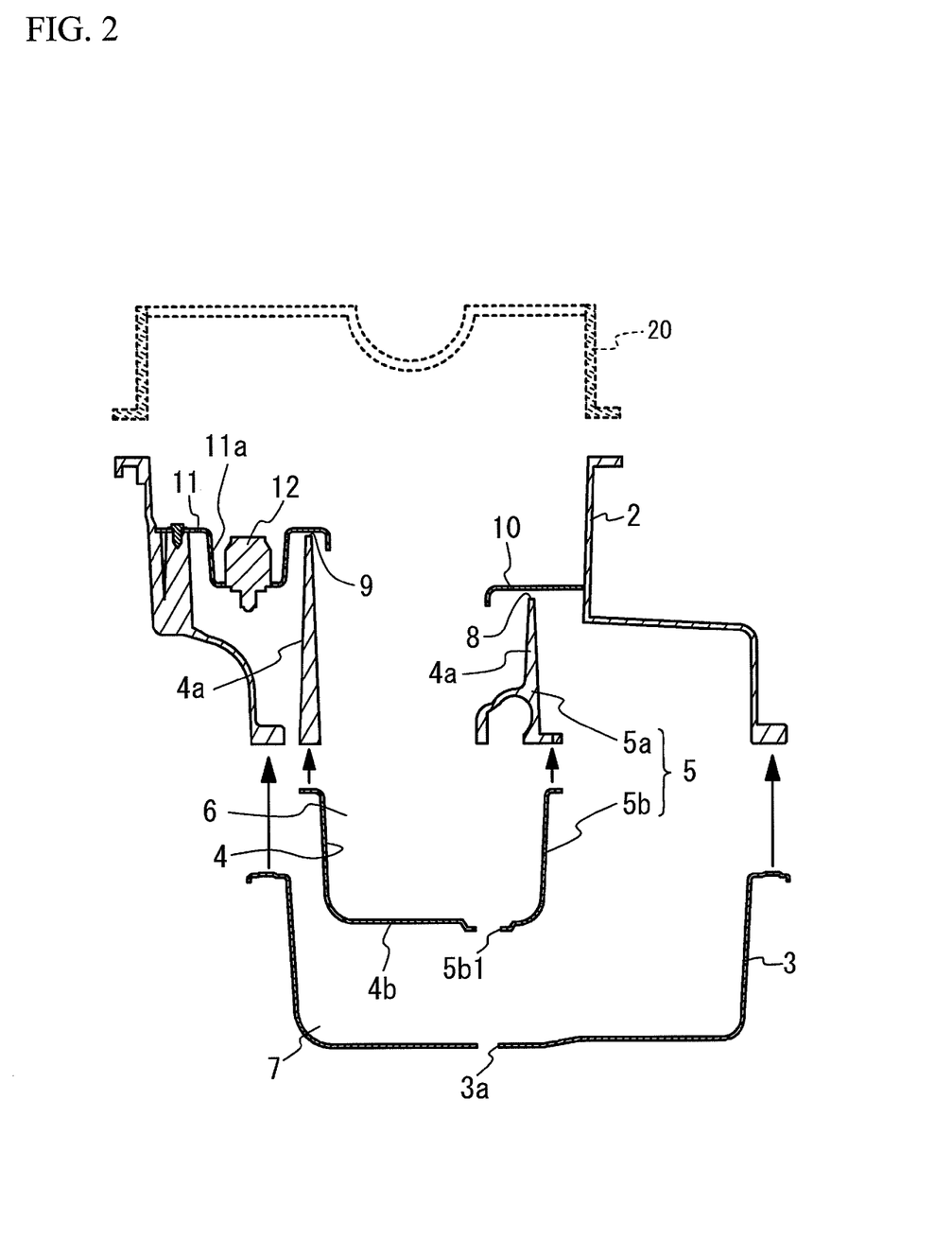
FIG. 2 illustrates an exploded cross sectional view of the oil pan structure.
Figure 3:
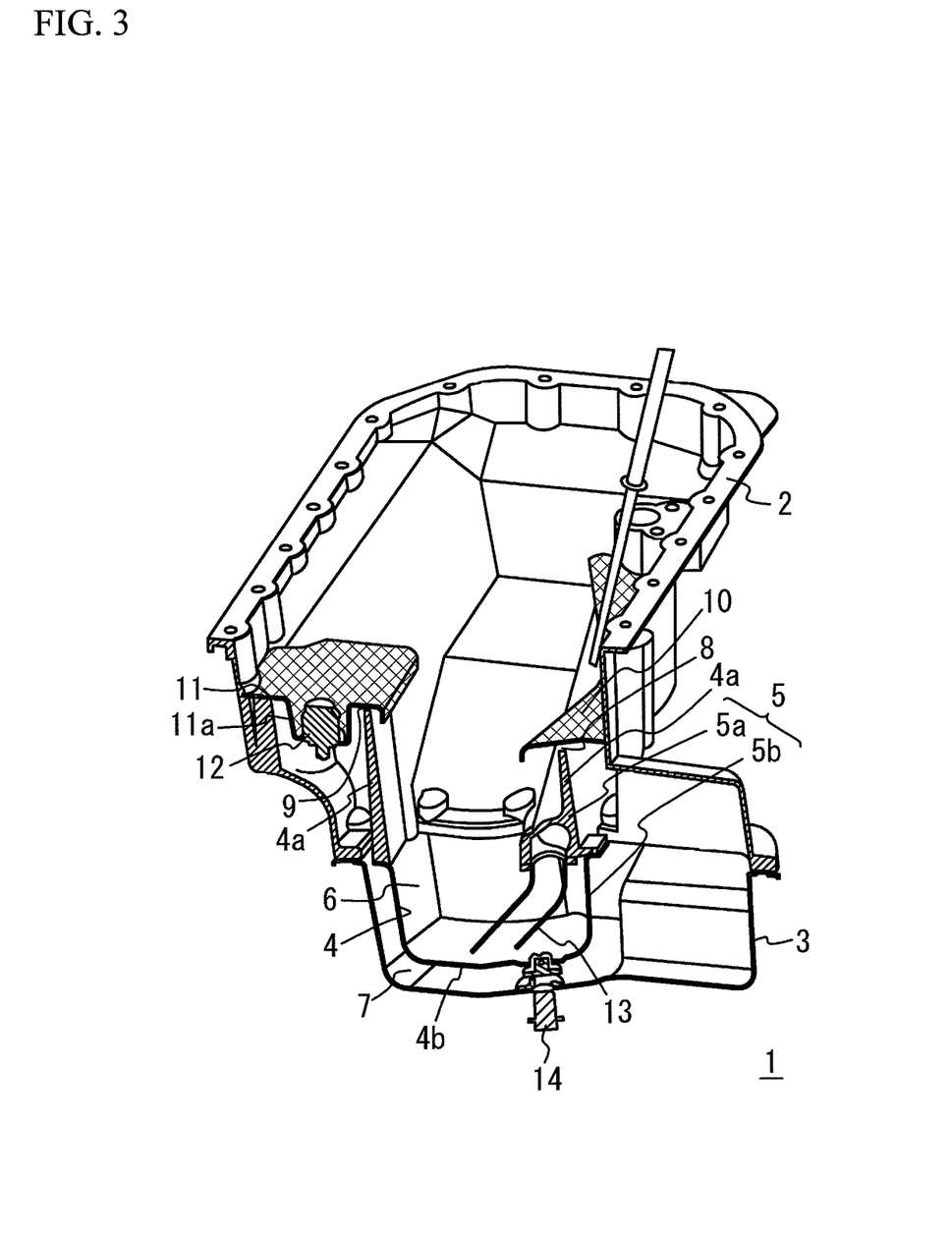
FIG. 3 illustrates an explanatory perspective view and cross sectional view of the oil pan structure.
Figure 4:
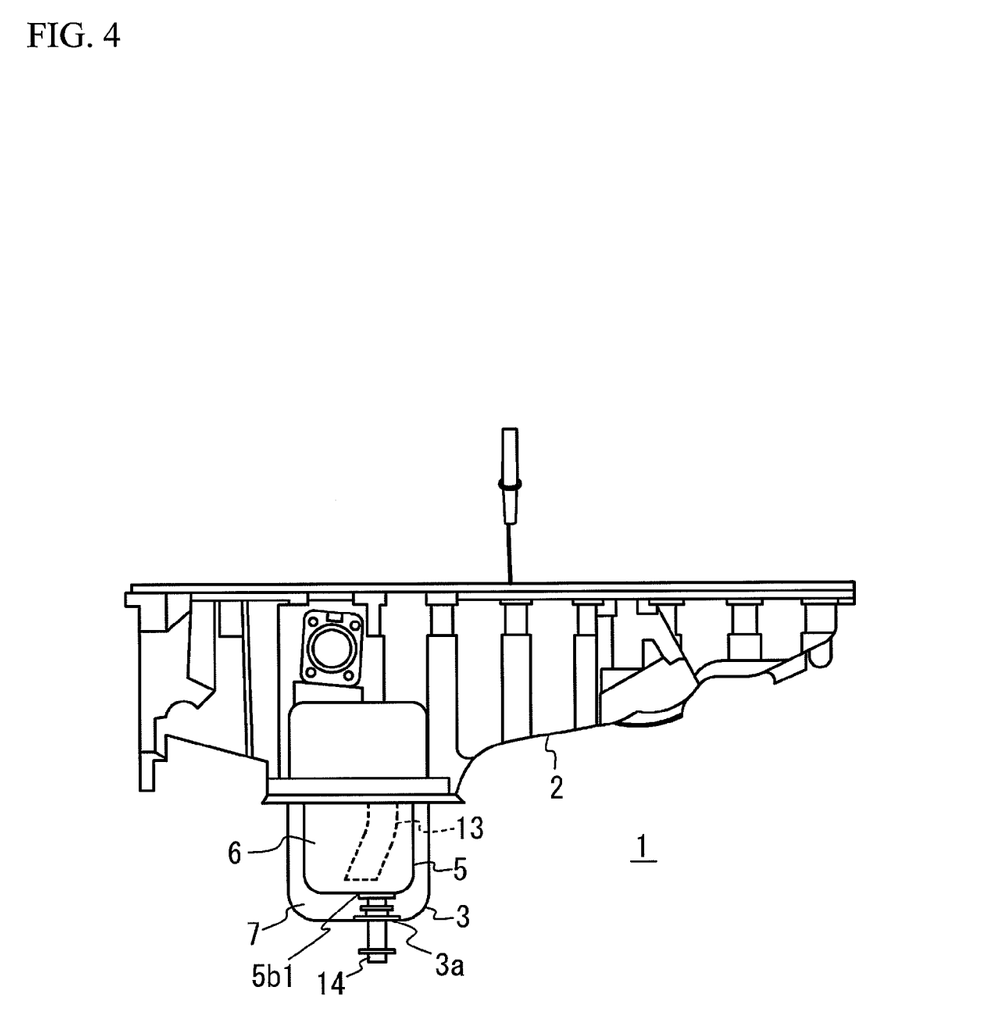
FIG. 4 illustrates a side view of the oil pan structure.

A description will be given of an oil pan structure 1 of the present invention with reference to drawings. FIG. 1 illustrates an explanatory cross sectional view of the oil pan structure 1. And, FIG. 2 illustrates an exploded cross sectional view of the oil pan structure 1. Further, FIG. 3 illustrates an explanatory perspective view and a cross sectional view of the oil pan structure 1. The oil pan structure 1 includes a lower structure 2 fixed to a lower portion of a lower block 20 forming a part of an engine block and a main oil pan 3 provided under the lower block 20 with the lower structure 2 being between the lower block 20 and the main oil pan 3. The lower structure 2 has a sloping face inside thereof for collecting engine oil falling from the engine block side. The lower structure 2 and the main oil pan 3 are adhered and bolted to each other.

The oil pan structure 1 includes a concave portion 4, and includes a sub oil pan 5 provided inside of the main oil pan 3. The sub oil pan 5 forms a first chamber 6 having concave shape and a second chamber 7 around the first chamber 6, in the main oil pan 3. The sub oil pan 5 is separated into an upper body 5a and a lower body 5b. The upper body 5a includes a sidewall portion 4a of the concave portion 4. The lower body 5b includes a bottom portion 4b of the concave portion 4.

The upper body 5a of the sub oil pan 5 is formed integrally with the lower structure 2. That is, the upper body 5a is formed by an injection molding together with the lower structure 2. The lower body 5b is adhered and bolted to a lower portion of the upper body 5a. Thus, the sub oil pan 5 having the concave shape is formed.

A top edge of the upper body 5a acts as communication portion of the engine oil. The cross section of the upper body 5a has different heights, as is obvious from the FIG. 1. A lower top edge of the upper body 5a acts as a first communication portion 8. An upper edge of the upper body 5a acts as a second communication portion 9. The engine oil circulates through the engine block, and falls and returns to the sub oil pan 5. A first cover 10 covering the first communication portion 8 and a second cover 11 covering the second communication portion 9 are provided in the lower structure 2 so that the returning engine oil does not enter the second chamber 7 directly. The second cover 11 includes a concave portion 11a. The concave portion 11a has a thermostat valve 12 that opens and closes according to the temperature of the engine oil stored therein and is fixed thereto.

A stuck port of a strainer 13 is arranged in the first chamber 6. Thus, the engine oil is provided into the engine block from the first chamber 6. A small amount of the engine oil in the first chamber 6 is mainly used as lubrication at warming up after starting of the engine. Therefore, the temperature of the engine oil rises promptly; the viscosity of the engine oil is reduced promptly with the temperature rising of the engine oil; and the friction is reduced. However, oil level in the first chamber 6 is reduced when the engine oil in the first chamber 6 is provided to the lubrication portion such as the engine block. The engine oil in the second chamber 7 flows into the first chamber 6 because of the different heights of the first communication portion 8 and the second communication portion 9 when the oil level is reduced to the first communication portion 8.

The engine oil returning from the engine block flows into the second chamber 7, when the thermostat valve 12 opens after the temperature of the engine oil that returns from the engine block and is stored in the concave portion 11a of the second cover 11 is high. The engine oil directly flowing into the second chamber 7 flows into the first chamber 6 through the first communication portion 8 after mixed with the engine oil stored in the second chamber 7, and is used as the lubricant again. The thermostat valve 12 is immersed in the engine oil in the concave portion 11a constantly. Therefore, the thermostat valve 12 is hardly fixed in spite of blow-by gas; and the friction of a sealing portion of the thermostat valve 12 is reduced.

In the oil pan structure 1 having the engine oil circulation, the position of the communication portion, particularly first communication portion 8, has an influence on the circulation amount of the engine oil between the first chamber 6 and the second chamber 7. It is preferable that the amount of the engine oil stored in the first chamber 6 and provided to the engine block is small from a view point of the prompt rising of the temperature of the engine oil. However, it is a problem that only small amount of the engine oil is used as the lubricant in view of degradation of the engine oil. The height of the first communication portion 8 is determined so that an adequate amount of the engine oil circulates with respect to the both requirements. With the structure in accordance with the embodiment, the position of the first communication portion 8 is determined accurately. And the variation of the products is restrained. The amount of the engine oil used for the circulation is changed when the height of the first communication portion 8 is slightly changed. And so, the variation of the height of the first communication portion 8 is restrained when the upper body 5a is formed integrally with the lower structure 2, as is the case of the embodiment.

With the structure in accordance with the embodiment, maintenance of the sub oil pan 5 is easy when the sub oil pan 5 is broken. That is, the lower body 5b has only to be exchanged. It is advantageous in cost.

The oil pan structure 1 has a double-bath structure. Therefore, oil drains 3a and 5b1 are provided in the main oil pan 3 and the sub oil pan 5 respectively so that engine oil is replaced easily. A single drain plug 14 is fixed to the oil drains 3a and 5b1. The strainer 13 is connected to an engine oil path provided in the lower structure 2. A mesh removing foreign substance is provided in the engine oil path in the lower structure 2. This allows absorbing space limitation of the first chamber 6.

The lower body 5b of the sub oil pan 5 is made of iron plate in the embodiment. However, the lower body 5b may be made of resin satisfying a condition such as heat resistance.

Figure 5:
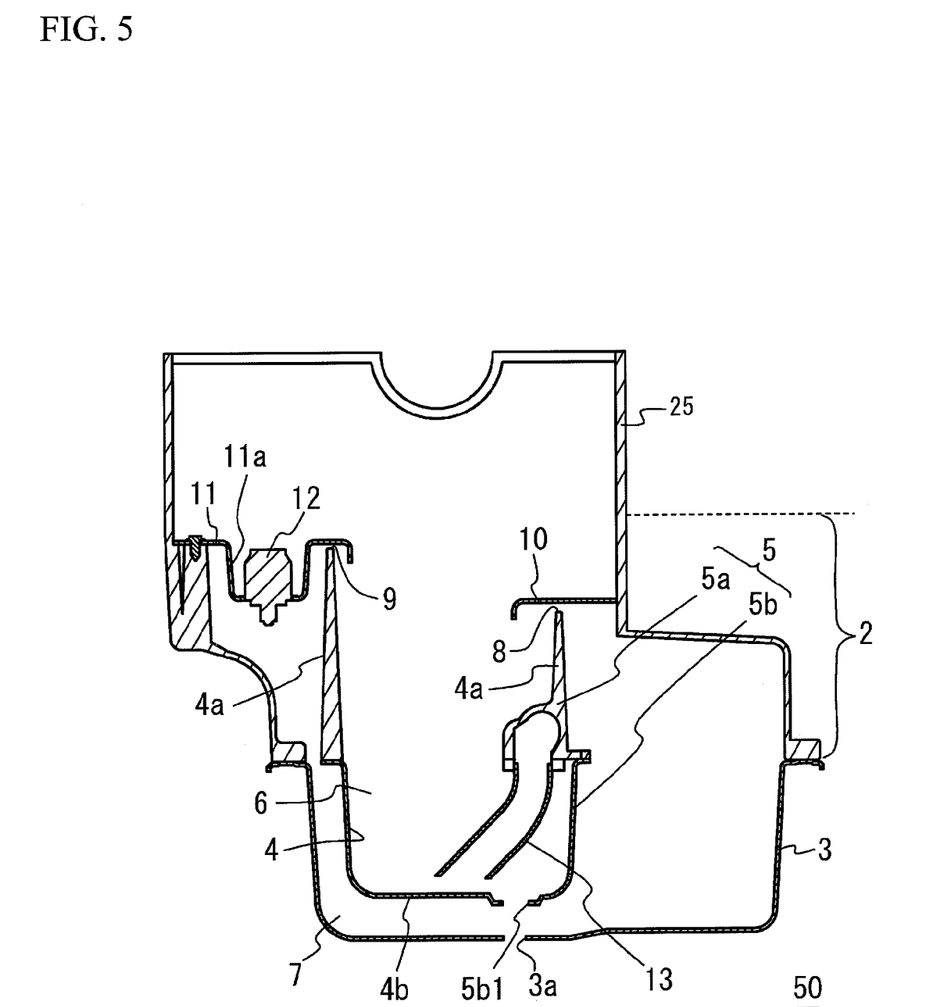
FIG. 5 illustrates an explanatory cross sectional view of another oil pan structure.
Figure 6:
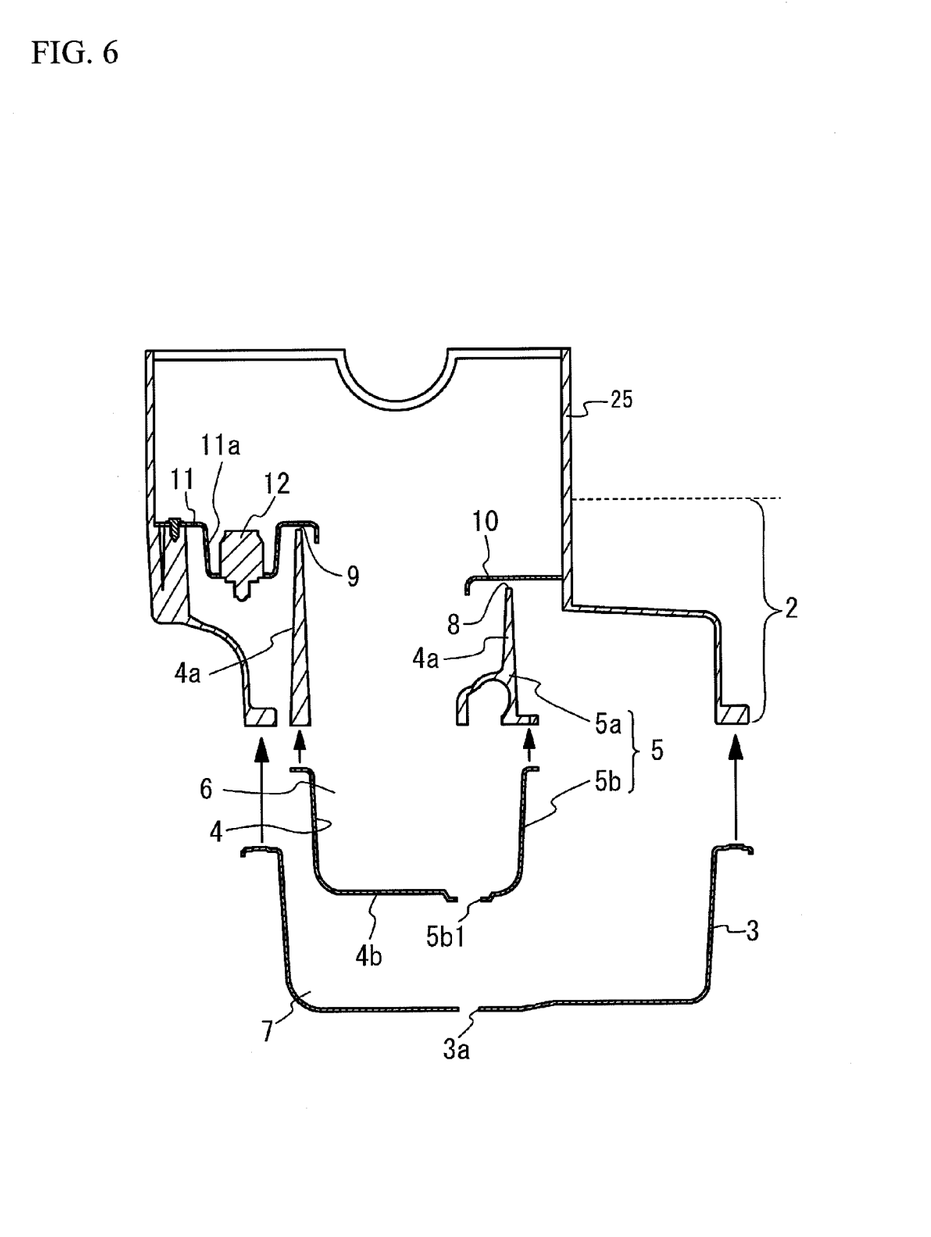
FIG. 6 illustrates an exploded cross sectional view of the oil pan structure.

The above-mentioned embodiments are only an example for carrying out the invention. The present invention is not limited to the embodiments, but includes other embodiments and variations without departing from the scope of the present invention, as is obvious from the above-mentioned description. For example, the lower structure 2 may be formed integrally with a lower block 25 forming the engine block as illustrated in FIG. 5 and FIG. 6, although the lower structure 2 is separated from the lower block 20 forming a part of the engine block. FIG. 5 illustrates an explanatory cross sectional view of an oil pan structure 50. FIG. 6 illustrates an exploded cross sectional view of the oil pan structure 50. The lower structure 2 is formed by casting together with the lower block 25. That is, the lower block 25 and the lower structure 2 are formed integrally so that the lower portion of the lower block 25 acts as the lower structure 2. The lower structure 2 includes the upper body 5a formed integrally therewith. The lower body 5b is adhered and bolted to the upper body 5a. The main oil pan 3 is adhered and bolted to the lower portion of the lower structure 2. Variation of height of the first communication portion 8 between products is restrained with the structure.

The invention claimed is:

1. An oil pan structure comprising:
   a main oil pan provided under an engine block; and
   a sub oil pan that is provided inside of the main oil pan and forms a first chamber and a second chamber inside of the main oil pan,
   the first chamber being a space inside of the sub oil pan,
   the second chamber being a space between the main oil pan and the sub oil pan,
   the sub oil pan being separated into an upper body formed as a single piece together with a lower structure of the engine block and a lower body fixed to the upper body,
   each of the main oil pan and the sub oil pan including discrete walls that are fixed to the lower structure of the engine block and have a distance from each other,
   the lower structure of the engine block and the upper body of the sub oil pan being formed as the single piece by an injection molding together with each other,
   the upper body of the sub oil pan comprising a first communication portion extending in a first direction and a second communication portion extending in the first direction, each of the first communication portion and the second communication portion make a communication between the first chamber and the second chamber,
   the first communication portion and the second communication portion being spaced from each other and sandwiching the first chamber,
   a height of the first communication portion and the second communication portion being different from each other,
   an uppermost part of a first portion of the upper body of the sub oil pan extending in the first direction forms and delimits a bottom of the first communication portion, and an uppermost part of a second portion of the upper body of the sub oil pan extending in the first direction forms and delimits a bottom of the second communication portion, the first direction being a direction linearly extending along a longitudinal direction of a face forming the uppermost parts of the first portion and the second portion,
   a first cover connected to the upper body of the oil pan at a first position outside of the first chamber and extending inside the first chamber, the first cover including a first cover portion extending in a second direction orthogonal to the first direction, the first cover portion forming and delimiting a ceiling of the first communication portion,
   a second cover connected to the upper body of the oil pan at a second position outside of the first chamber and extending inside the first chamber, the second cover including a second cover portion extending in the second direction, the second cover portion forming and delimiting a ceiling of the second communication portion, and
   the second cover is configured to selectively permit oil to flow through the second cover into the second chamber.

2. The oil pan structure as claimed in claim 1, wherein the lower structure is separated from the engine block and is provided between the engine block and the main oil pan.

3. The oil pan structure as claimed in claim 1, wherein the lower structure acts as a bottom portion of the engine block.

4. The oil pan structure as claimed in claim 1, wherein the first portion of the upper body of the sub oil pan and the second portion of the upper body of the sub oil pan being provided at opposing sides of the first chamber.

* * * * *